United States Patent
Sadabadi et al.

(10) Patent No.: US 10,774,875 B2
(45) Date of Patent: Sep. 15, 2020

(54) MICROFLUIDIC-ASSISTED HYDRODYNAMIC LUBRICATION SYSTEM AND METHOD

(71) Applicant: NATIONAL OILWELL VARCO, L.P., Houston, TX (US)

(72) Inventors: Hamid Sadabadi, Edmonton (CA); Amir Sanati Nezhad, Calgary (CA); Masoud Kalantari, Calgary (CA); Nicholas Ryan Marchand, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 36 days.

(21) Appl. No.: 16/063,434

(22) PCT Filed: Dec. 16, 2016

(86) PCT No.: PCT/US2016/067264
§ 371 (c)(1),
(2) Date: Jun. 18, 2018

(87) PCT Pub. No.: WO2017/106708
PCT Pub. Date: Jun. 22, 2017

(65) Prior Publication Data
US 2018/0372157 A1 Dec. 27, 2018

Related U.S. Application Data

(60) Provisional application No. 62/269,719, filed on Dec. 18, 2015.

(51) Int. Cl.
*F16C 33/10* (2006.01)
*F16C 17/10* (2006.01)

(52) U.S. Cl.
CPC ........ *F16C 33/1075* (2013.01); *F16C 17/105* (2013.01); *F16C 33/103* (2013.01);
(Continued)

(58) Field of Classification Search
CPC .......... E21B 4/003; E21B 10/22; E21B 10/23; F16K 99/0001; F16K 99/001;
(Continued)

(56) References Cited

U.S. PATENT DOCUMENTS 4,007,974 A * 2/1977 Huber .................. F16C 17/045
384/123
4,074,922 A * 2/1978 Murdoch ................ E21B 10/22
384/95

(Continued)

OTHER PUBLICATIONS

International Search Report and Written Opinion dated Mar. 24, 2017, for international application No. PCT/US2016/067264 (14 pgs.).

*Primary Examiner* — Alan B Waits
(74) *Attorney, Agent, or Firm* — Conley Rose, P.C.

(57) ABSTRACT

A lubrication system includes a pair of mating surfaces subject to relative motion and a source of lubrication in communication with the mating surfaces. A microfluidic channel system including at least one diffuser element is disposed in an interface between the mating surfaces to create a coherent fluid film at the interface in response to the relative motion.

19 Claims, 6 Drawing Sheets

(52) U.S. Cl.
CPC ...... *F16C 33/1085* (2013.01); *F16C 2352/00* (2013.01); *F16C 2361/41* (2013.01)

(58) Field of Classification Search
CPC .................. F16C 17/026; F16C 17/045; F16C 17/10–107; F16C 33/103; F16C 33/1065; F16C 33/1085; F16C 33/105; F16C 33/107; F16C 33/1045; F16C 33/1075; F16C 2352/00; F16C 2361/41; F04B 19/00; F04B 19/006
See application file for complete search history.

(56) References Cited

U.S. PATENT DOCUMENTS

| | | | | |
|---|---|---|---|---|
| 4,157,122 | A * | 6/1979 | Morris | E21B 10/20 175/369 |
| 4,491,373 | A * | 1/1985 | Sugi | F16C 17/02 384/13 |
| 4,728,201 | A * | 3/1988 | Abbe | F16C 17/045 384/100 |
| 4,772,246 | A * | 9/1988 | Wenzel | E21B 4/02 464/117 |
| 6,149,160 | A | 11/2000 | Stephens et al. | |
| 6,176,621 | B1 | 1/2001 | Naitoh et al. | |
| 6,341,782 | B1 | 1/2002 | Etsion et al. | |
| 7,896,550 | B1 * | 3/2011 | Pinera | F16C 17/02 384/100 |
| 8,657,500 | B2 * | 2/2014 | Tung | F16C 33/103 384/129 |
| 8,668,388 | B1 * | 3/2014 | Peterson | F16C 17/045 384/322 |
| 9,618,039 | B2 * | 4/2017 | Arnold | F16C 33/04 |
| 9,915,106 | B2 * | 3/2018 | Underwood | E21B 17/20 |
| 2003/0156769 | A1 * | 8/2003 | Whang | F16C 17/02 384/291 |
| 2006/0051000 | A1 | 3/2006 | Etsion et al. | |
| 2006/0192451 | A1 * | 8/2006 | Hong | F16C 17/026 310/90 |
| 2007/0211978 | A1 * | 9/2007 | Engesser | F16C 33/78 384/517 |
| 2008/0112658 | A1 | 5/2008 | Justin | |
| 2008/0152271 | A1 | 6/2008 | Barlerin et al. | |
| 2008/0239570 | A1 * | 10/2008 | Kumoi | G11B 17/0282 360/135 |
| 2009/0092347 | A1 * | 4/2009 | Ito | F16C 17/107 384/119 |
| 2010/0132197 | A1 * | 6/2010 | Hori | F16C 17/026 29/898.02 |
| 2012/0080230 | A1 * | 4/2012 | Flores | E21B 10/23 175/57 |
| 2012/0280456 | A1 | 11/2012 | Young et al. | |
| 2012/0285748 | A1 * | 11/2012 | Kirkhope | E21B 4/003 175/371 |
| 2013/0299243 | A1 * | 11/2013 | von Gynz-Rekowski | F16C 17/105 175/57 |
| 2015/0252839 | A1 | 9/2015 | Turmeau et al. | |
| 2016/0040484 | A1 * | 2/2016 | Underwood | E21B 17/20 464/152 |
| 2016/0223015 | A1 | 8/2016 | Arnold | |
| 2016/0327088 | A1 * | 11/2016 | Peterson | F16C 33/043 |
| 2017/0009810 | A1 * | 1/2017 | Futae | F02B 39/14 |
| 2017/0159717 | A1 * | 6/2017 | Marchand | E21B 17/046 |
| 2017/0343042 | A1 * | 11/2017 | Kato | F16C 43/02 |
| 2018/0058499 | A1 * | 3/2018 | Sundararaman | F16C 33/107 |
| 2018/0094489 | A1 * | 4/2018 | Lu | F16D 3/68 |
| 2019/0024708 | A1 * | 1/2019 | Wilson | F16O 33/125 |

* cited by examiner

MICROFLUIDIC-ASSISTED HYDRODYNAMIC LUBRICATION SYSTEM AND METHOD

CROSS-REFERENCE TO RELATED APPLICATIONS

This application is a 35 U.S.C. § 371 national stage application of PCT/US2016/067264 filed Dec. 16, 2016, and entitled "Microfluidic-Assisted Hydrodynamic Lubrication System and Method," which claims benefit of U.S. application No. 62/269,719 filed on Dec. 18, 2015, both of which are incorporated herein by reference in their entirety for all purposes.

BACKGROUND

The disclosure relates generally to lubrication of mating surfaces subject to relative motion and loading. More specifically, the disclosure relates to hydrodynamic lubrication of mating surfaces subject to reciprocating motion under load.

When two solid surfaces in mechanical contact slide relative to each other, the solid surfaces are subject to wear due to dry friction. When the solid surfaces are bearing surfaces, it is desirable to minimize the dry friction between the surfaces in order to prevent premature failure of the bearing due to surface wear. Lubrication is a common technique for reducing dry friction between two mating surfaces subject to relative motion. Fluid film bearings rely on a thin film of lubricant interposed between the mating surfaces to create clearance between the mating surfaces. In these bearings, dry friction between the mating surfaces is essentially replaced with fluid friction between layers of the lubricating film, and the load applied to the bearing will be supported by the viscous forces in the lubricating film.

Fluid film bearings may be hydrostatic bearings or hydrodynamic bearings. Hydrostatic bearings use an external source of pressurized fluid to force lubricant between the mating surfaces. Hydrostatic bearings have a load capacity and direct stiffness that do not depend on relative motion between the mating surfaces. In contrast, hydrodynamic bearings use relative motion between the mating surfaces to maintain a lubricating fluid film between the mating surfaces. The most basic hydrodynamic bearing is a journal bearing in which a journal pulls a converging wedge of lubricant between the journal and the bearing. The wedge forms between the journal and bearing due to the journal being eccentric with the bearing as the journal rotates. As the journal gains velocity, liquid flows between the two surfaces at a greater rate. The lubricant, because of its velocity, produces a liquid pressure in the lubricant wedge that is sufficient to keep the two surfaces separated while supporting the applied load.

True hydrodynamic lubrication is difficult to achieve between mating surfaces operating under reciprocating motion and load. The reciprocating motion will prevent formation of a coherent fluid film in the interface between the mating surfaces. Without a coherent fluid film between the mating surfaces, boundary lubrication will prevail over hydrodynamic lubrication during normal operation. In the boundary lubrication mode, the mating surfaces will be partially separated by fluid and partially in mechanical contact. Such mechanical contact, when coupled with high contact pressure between the mating surfaces, will accelerate wear of the mating surfaces compared to the case where full-film hydrodynamic lubrication develops and is maintained during normal operation.

SUMMARY

In one aspect, a hydrodynamic lubrication system includes a pair of mating surfaces subject to relative motion. A source of lubricant is in communication with the mating surfaces. A microfluidic channel system including at least one diffuser element is disposed in an interface between the mating surfaces to create a coherent fluid film at the interface in response to the relative motion.

In another aspect, a method of forming a hydrodynamic lubrication between a pair of mating surfaces includes providing a microfluidic channel system including at least one diffuser element at an interface between the mating surfaces. The method includes connecting the mating surfaces to a source of lubricant. The method further includes subjecting the mating surfaces to relative motion, wherein the microfluidic channel system creates a coherent fluid film at the interface in response to the relative motion.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

A method of lubricating two mating surfaces subject to relative motion and loading includes disposing a microfluidic channel system at an interface between the mating surfaces. The microfluidic channel system creates a coherent fluid film between the mating surfaces in response to relative motion between the mating surfaces. In one embodiment, the microfluidic channel system includes one or more micropump modules, and each micropump module includes a diffuser element. In one embodiment, the microfluidic channel system is disposed between the mating surfaces by embedding the micropump module(s) in one of the mating surfaces. In another embodiment, the microfluidic channel system is disposed at an interface between the mating surfaces by forming the micropump module(s) in a thin plate and attaching the thin plate to one of the mating surfaces. The thin plate may be made to conform to the shape of the respective mating surface. Each diffuser element in a micropump module is configured such that relative motion between the mating surfaces creates a net flow of lubricant through the diffuser element. The microfluidic channel system uses the pumping action of the diffuser element(s) to create the coherent fluid film at the interface between the mating surfaces. The coherent fluid film in turn facilities development of full-film hydrodynamic lubrication between the mating surfaces. The microfluidic channel system can be used between any pair of mating surfaces where hydrodynamic lubrication is desired, even between mating surfaces subject to reciprocating motion under load or high contact pressure.

Figure 1A:
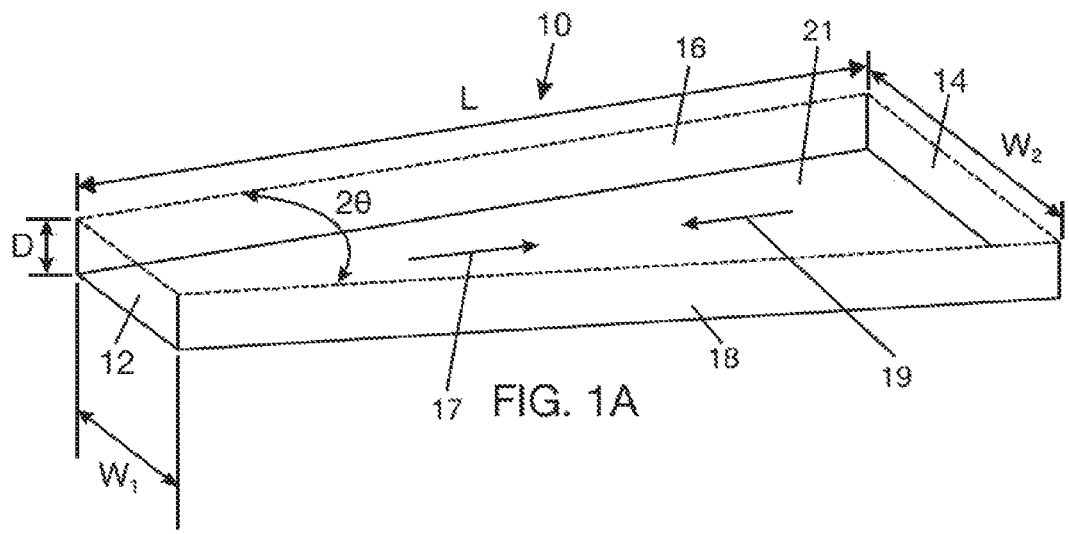
FIG. 1A shows a general structure of a diffuser element.
Figure 1B:
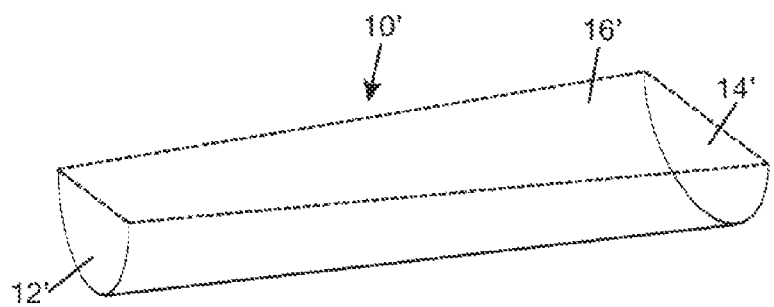
FIG. 1B shows a conical diffuser element.
Figure 1C:
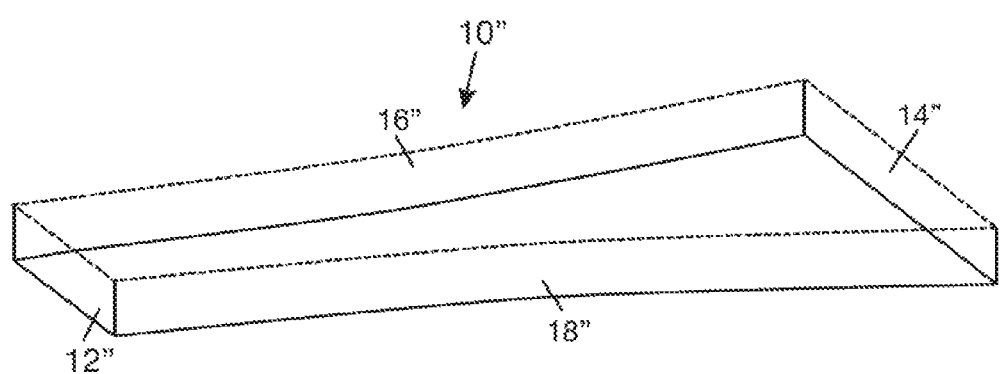
FIG. 1C shows a flat diffuser element with curved channel walls.

A diffuser element is a flow channel with gradually expanding cross-section. FIG. 1A shows a general structure of a diffuser element 10 having a throat (small opening) 12 with a width $W_1$ at one end and an exit (large opening) 14 with a width $W_2$ at another end, where $W_1<W_2$. Channel walls 16, 18, 21 extend between the throat 12 and exit 14. The diffuser element 10 is shown as a flat diffuser having a rectangular cross-section. However, other diffuser shapes are possible. For example, FIG. 1B shows a conical diffuser element 10' having circular throat 12' and exit 14' and a cylindrical channel wall 16' extending between the throat 12' and exit 14'. FIG. 1C shows a flat diffuser element 10" having curved channel walls 16", 18" extending between the rectangular throat 12" and exit 14". Returning to FIG. 1A, the throat 12 and exit 14 are separated by a channel length L. The diffuser element 10 has an opening angle 20 at the throat 12 and a channel depth D. The widths $W_1$, $W_2$, length L, opening angle 20, and depth D are design parameters whose values can be selected to achieve desired flow rates through the diffuser element 10 for a given lubricant viscosity.

In FIGS. 1A-1C, the dashed lines indicate the open side of the diffuser elements 10, 10', 10". The open side presents an opportunity to impart motion to a boundary of flow inside the diffuser element. The positive direction of the diffuser element 10 is from the throat 12 to the exit 14, as indicated by arrow 17 in FIG. 1A. The negative direction is from the exit 14 to the throat 12, as indicated by arrow 19. The diffuser element 10 has a higher flow resistance in the negative direction 19 than in the positive direction 17 for the same flow velocity. When the diffuser element 10, or variations thereof, is embedded in one of a pair of mating surfaces, relative motion, such as sliding motion or reciprocating motion, between the mating surfaces will cause fluid to move through the diffuser element 10. A net flow will be pumped through the diffuser element 10 due to the different flow resistances in the positive and negative directions 17, 19 of the diffuser element. The diffuser element 10 will essentially function as a micropump providing a positive volume of lubricant between the mating surfaces.

In one embodiment, to achieve the pumping effect of the diffuser element 10, the ratio of $W_2$ to $W_1$ (i.e., $W_2/W_1$) may be in a range from 1.2 to 2.5. $W_2/W_1$ ratio above 2.5 may also create a pumping effect, but the pumping effect may not be very high. In one embodiment, the ratio of $W_1$ to L may be 0.15 or higher. In one embodiment, each of $W_1$, $W_2$, and L may be in a range from 1 mm to 2 mm. In general, the parameters of the diffuser element 10 will also depend on the viscosity of the lubricant. The above parameter values have been used with water, which has a viscosity of 0.001 Pa·s, and a lubricating oil having a viscosity of 0.045 Pa·s at 100° C. and 0.300 at 40° C.

Figure 2:
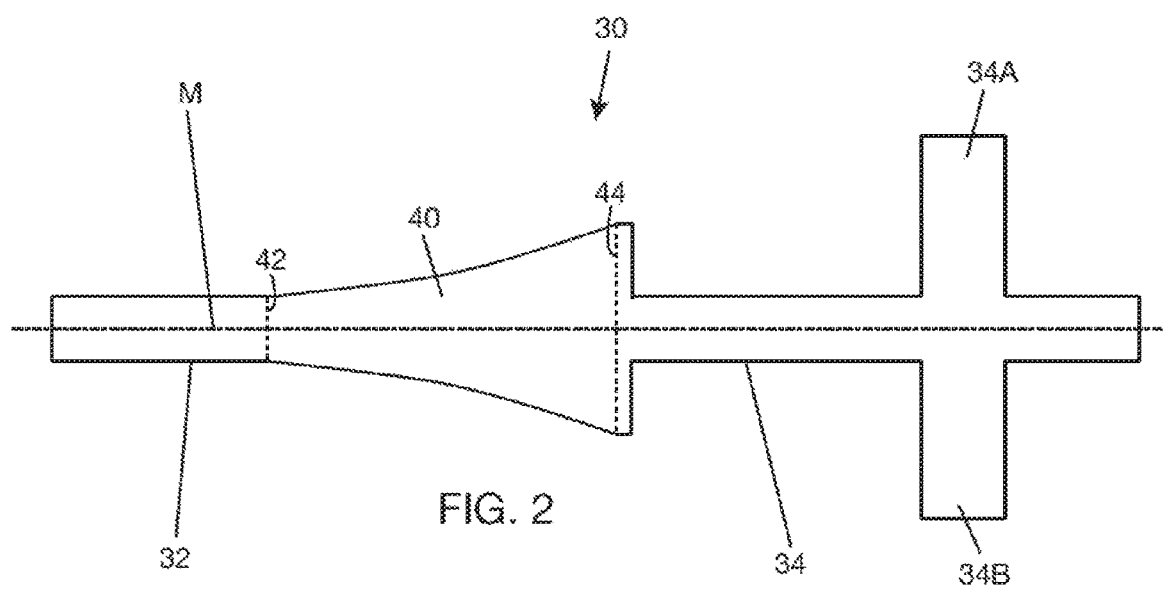
FIG. 2 is a schematic of a micropump module.

FIG. 2 shows a micropump module 30 having a main flow axis M according to one illustrative embodiment. The micropump module 30 includes a diffuser element 40 having a throat 42 and exit 44. The diffuser element 40 may have the characteristics described above for the diffuser element 10. The diffuser element 40 is aligned along the main flow axis M such that flow through the diffuser element 40 is generally along the main flow axis M. The micropump module 30 may include other flow channels 32, 34 connected to the throat 42 and exit 44, respectively, for continuity of flow along the micropump module 30. The configuration of the other flow channels 32, 34 may vary between micropump modules. For example, the flow channel 34 is shown as having flow branches 34A, 34B. In some micropump modules, these flow branches may be omitted.

Figure 3A:
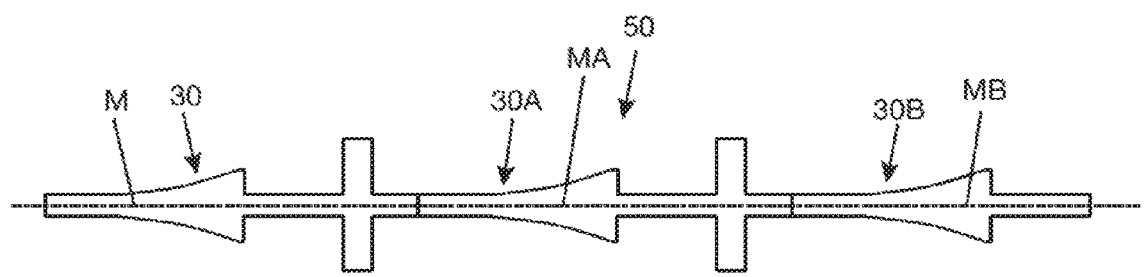
FIG. 3A is a schematic of a microfluidic channel system including micropump modules.

FIG. 3A shows a microfluidic channel system 50 including micropump modules 30, 30A, 30B according to one illustrative embodiment. The main flow axes M, MA, MB of the micropump modules 30, 30A, 30C are aligned and determine the main flow direction of the microfluidic channel system. As previously noted, a microfluidic channel system 50 may have one or more micropump modules. Therefore, the number of micropump modules shown in FIG. 3A are for illustration purposes only.

Figure 3B:
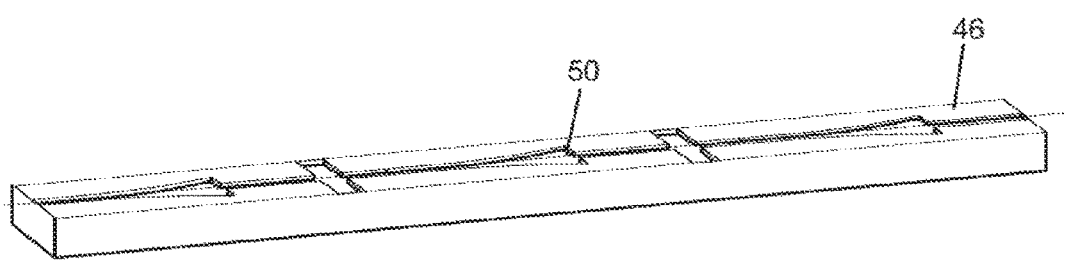
FIG. 3B shows the microfluidic channel system of FIG. 3A embedded in a planar surface.

FIG. 3B shows a general representation of a microfluidic channel system 50 embedded, or formed, in a surface 46. The surface 46 is shown as a planar surface, but it could be a curved surface in other examples. The surface 46 may be one of a pair of mating surfaces, or the surface 46 may be a thin plate to be adhered to one of a pair of mating surfaces.

Figure 3C:
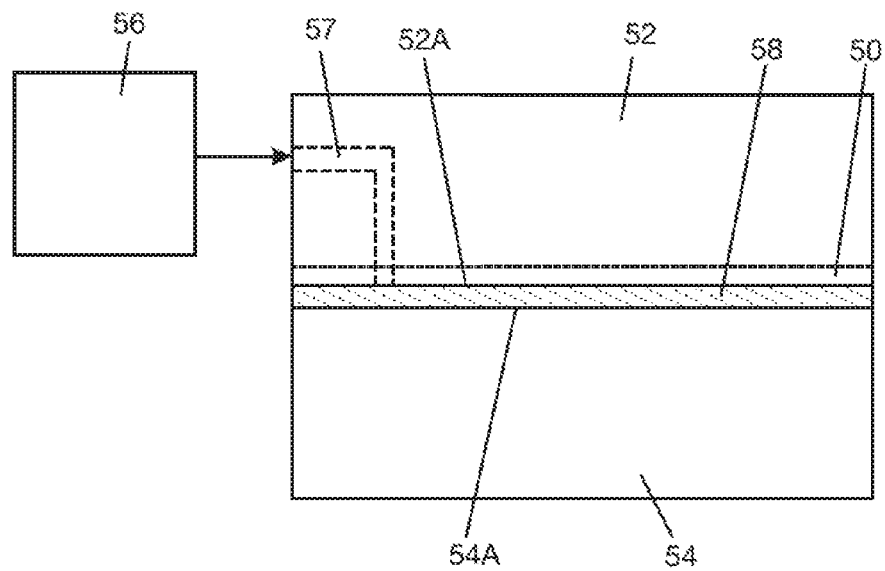
FIG. 3C shows a generalized structure of a microfluidic-assisted lubrication system.

FIG. 3C shows a general representation of a microfluidic-assisted lubrication system. In FIG. 3C, mating surfaces 52A, 54A of members 52, 54 are in opposing relation. The members 52, 54 generally represent bearing components or other two objects subject to relative motion and loading. One or both of the mating members 52, 54 may move to provide a relative motion between the mating surfaces 52A, 54A. In one embodiment, the relative motion is a sliding motion or a reciprocating motion. In another embodiment, the relative motion may be rotational motion. A microfluidic channel system 50 is disposed in an interface between the mating surfaces 52A, 54A. For example, in one embodiment, this may involve embedding the microfluidic channel system 50 in one of the mating surfaces, e.g., mating surface 52A. The mating surfaces 52A, 54A are in communication with a source of lubricant 56. The source 56 can be a chamber filled with lubricant. The source 56 may be connected to a flow passage 57 formed in one of the members 52, 54. Alternatively, the members 52, 54 may be encapsulated in the source 56 so that the peripheries of the mating surfaces 52A, 54A are exposed to the lubricant. For hydrodynamic lubrication, a pump is not required to force the lubricant from the source 56 to the mating surfaces 52A, 54A. Instead, as the mating surfaces 52A, 54A move relative to each other, lubricant will be pulled onto the mating surfaces 52A, 54A to form a lubricant film 58. Development of the hydrodynamic mode of the lubricant film 58 will be aided by the microfluidic channel system 50 that provides a net flow of lubricant and coherent fluid film between the mating surfaces 52A, 54A as the mating surfaces move relative to each other.

Figure 4A:
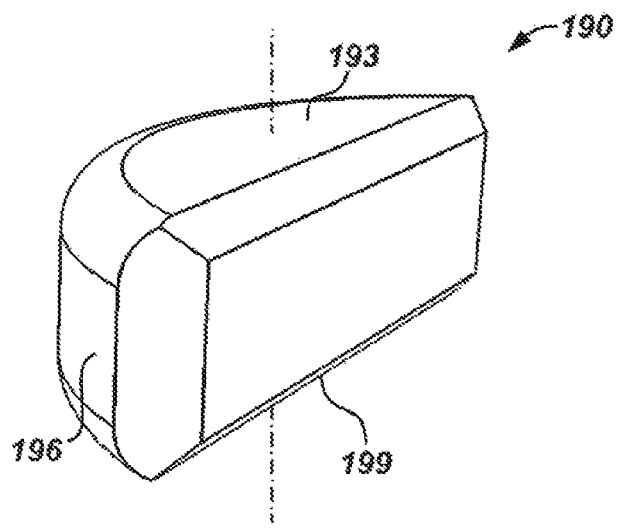
FIG. 4A shows a prior art torque transfer key.
Figure 4B:
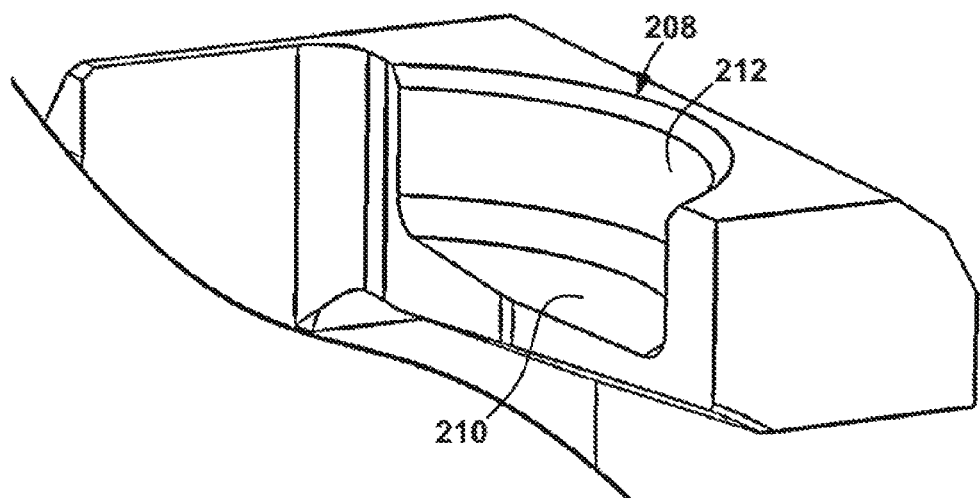
FIG. 4B shows a prior art recess in an adapter arm for receiving the prior art torque transfer key of FIG. 4A.
Figure 4C:
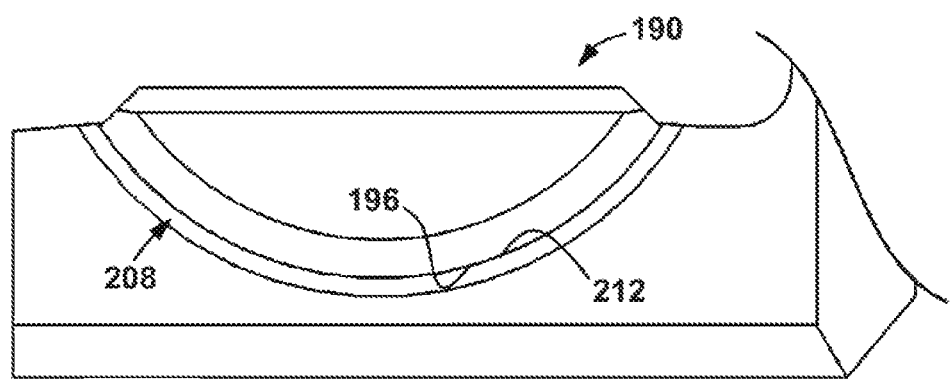
FIG. 4C shows the prior art torque transfer key of FIG. 4A disposed in the prior art recess of FIG. 4B.

One practical application of the microfluidic-assisted lubrication system is in a universal joint that is used in downhole drilling motors and described in International Application No. PCT/US2015/040513 titled "Universal Driveshaft Assembly," the content of which is incorporated herein by reference. This universal joint includes a torque transfer assembly having a plurality of torque transfer keys that mate with recesses in the arms of an adapter. FIG. 4A shows one of the torque transfer keys 190 having a D-shape defined by a convex cylindrical surface 196 and parallel planar surfaces 193, 199. FIG. 4B shows one of the adapter recesses 208 shaped to receive a torque transfer key 190. The recess 208 has a planar floor surface 210 and a concave cylindrical surface 212. FIG. 4C shows the torque transfer key 190 disposed in the recess 208. In this position, the convex cylindrical surface 196 of the torque transfer key 190 mates with the concave cylindrical surface 212 of the recess 208, and one of the planar surfaces 193, 199 of the torque transfer key 190 mates with the planar floor 210 of the recess 208.

Figure 4D:
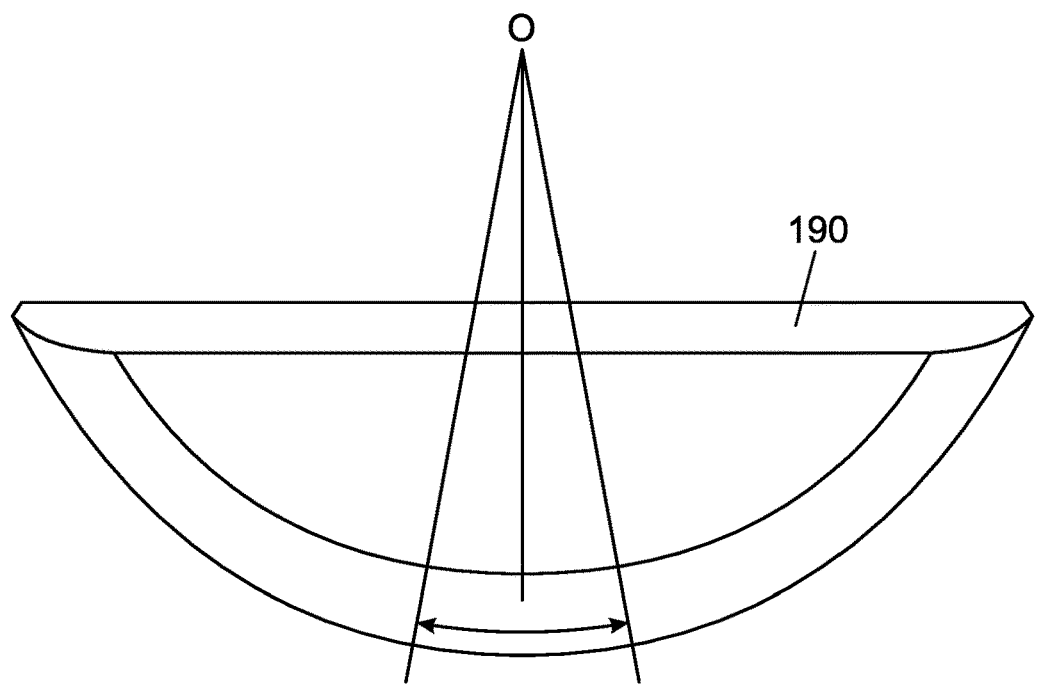
FIG. 4D shows pivoting motion of the torque transfer key of FIG. 4A.

The torque transfer key 190 is allowed to pivot relative to the recess 208. FIG. 4D illustrates pivoting motion of the torque transfer key 190 about a center O. As the torque transfer key 190 pivots, there will be relative sliding and reciprocating motion between the torque transfer key convex surface 196 and the recess concave surface 212 and between the torque transfer key planar surface 193 (or 199) and the recess planar floor surface 210. The mating surfaces are also subject to relatively high contact pressure due to the loads imposed on the torque transfer assembly during use of the universal joint.

Figure 5A:
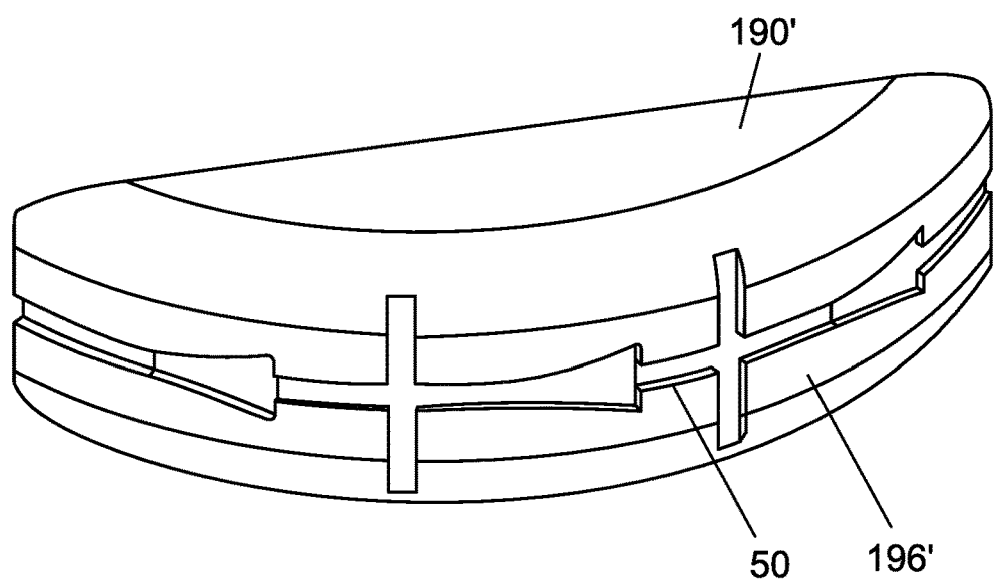
FIG. 5A shows a microfluidic channel system embedded in a curved surface of a torque transfer key.

FIG. 5A shows a torque transfer key 190' incorporating a microfluidic channel system 50. In the example shown in FIG. 5A, the microfluidic channel system 50 is embedded in the convex cylindrical surface 196' of the torque transfer key 190'. When the torque transfer key 190' is disposed in the recess 208 as explained above for the torque transfer key 190, the microfluidic channel system 50 will be between the convex cylindrical surface 196' of the torque transfer key 190' and the concave cylindrical surface 212 (see FIGS. 4B and 4C) of the recess 208. The arrangement of the microfluidic channel system 50 on the convex surface 196' may be such that the main flow axis of the microfluidic channel system 50 will be aligned with the direction of relative motion between the torque transfer key and adapter recess, i.e., along the direction of pivoting motion shown in FIG. 4D.

In use, the universal joint is encapsulated in an oil-filled chamber. The oil in the chamber is pulled in between the mating torque transfer key convex surface 196' having the microfluidic channel system 50 and the recess concave surface 212 by relative motion between the mating surfaces 196', 212, i.e., pivoting of the torque transfer key 190' relative to the mating recess 208. There will be a net flow of oil in each diffuser element of the microfluidic channel system 50 in response to the reciprocating or sliding motion of the mating surfaces 196', 212. The net flow of oil will provide a coherent fluid film in between the mating surfaces 196', 212 that will aid in development of full-film hydrodynamic lubrication between the mating surfaces during normal operation.

Figure 5B:
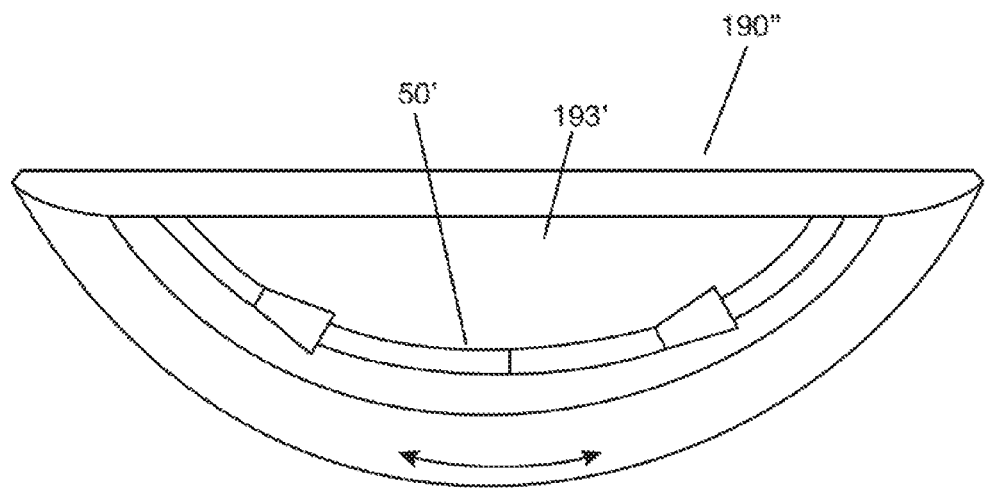
FIG. 5B shows a microfluidic channel system embedded in a planar surface of a torque transfer key.
Figure 5C:
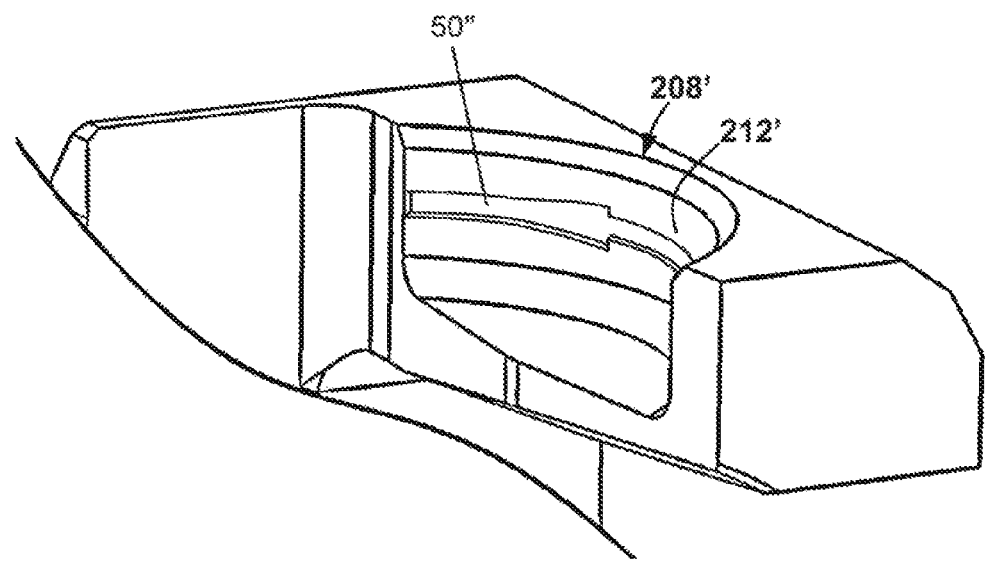
FIG. 5C shows a microfluidic channel system embedded in a curved surface of an adapter arm recess.

A microfluidic channel system could also be formed in the torque transfer key planar surface that would mate with the recess planar floor surface 210 to facilitate development of hydrodynamic lubrication between these surfaces. FIG. 5B shows an example of embedding a microfluidic channel system 50' in a planar surface 193' of a torque transfer key 190". Another possibility is to form a microfluidic channel system in the adapter arm recess. FIG. 5C shows a microfluidic channel system 50" embedded in the concave surface 212' of an adapter recess 208'. The microfluidic channel system 50" may be used in lieu of, or together with, the microfluidic channel system 50 (see FIG. 5A) in the mating torque transfer key 190' (see FIG. 5A).

The microfluidic-assisted lubrication system described above can be used wherever there are mating surfaces subject to relative motion and loading. These types of mating surfaces occur in various downhole tools, such as the universal joint described above. Another example is a rolling cutter drill bit and other such tools including bearings with mating surfaces subject to relative motion and loading. The microfluidic lubrication system may also be useful in biomechanics, such as between bearing surfaces in an artificial hip joint and the like. In general, the microfluidic-assisted lubrication system may be used between plain bearing surfaces, thrust bearing surfaces, radial bearing surfaces, and the like. The microfluidic-assisted lubrication system is especially useful under conditions where it would normally be difficult to develop hydrodynamic lubrication between mating surfaces, such as when the mating surfaces are operating under reciprocating motion and load.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hydrodynamic lubrication system, comprising:
    a pair of mating surfaces subject to relative reciprocating motion;
    a source of lubricant in communication with the mating surfaces; and
    a microfluidic channel system comprising at least one diffuser element disposed in an interface between the mating surfaces to create a coherent fluid film at the interface in response to the relative motion, wherein the at least one diffuser element comprises a throat having a throat width and an exit having an exit width that is greater than the throat width;
    wherein the microfluidic channel system comprises a first flow channel extending to the throat of the at least one diffuser element and a second flow channel extending from the exit, and wherein the exit width is greater than a width of both the first flow channel and the second flow channel;
    wherein the first flow channel, second flow channel, and the at least one diffuser element are each defined by a pair of sides and a floor surface each extending from the first flow channel, entirely through the at least one diffuser element, and to the second flow channel.

2. A downhole tool comprising the hydrodynamic lubrication system of claim 1, wherein the pair of mating surfaces are within the downhole tool and are subject to relative motion during use of the downhole tool.

3. The downhole tool of claim 2, wherein the source of lubricant is disposed within the downhole tool.

4. The downhole tool of claim 2, wherein the downhole tool is a universal joint comprising an adapter having at least one recess and at least one torque transfer key adapted to mate with the recess.

5. The downhole tool of claim 4, wherein one of the mating surfaces is a bearing surface of the torque transfer key, and wherein the other of the mating surfaces is a bearing surface of the recess.

6. The lubrication system of claim 1, wherein the microfluidic channel system is embedded in one of the mating surfaces.

7. The lubrication system of claim 1, wherein the mating surfaces are curved surfaces.

8. The lubrication system of claim 1, wherein the mating surfaces are planar surfaces.

9. The lubrication system of claim 1, wherein a ratio of the exit width to the throat width of the at least one diffuser element is in a range from 1.2 to 2.5.

10. The lubrication system of claim 9, wherein the at least one diffuser element has a length between the exit width and throat width, and wherein the ratio of the throat width to the length is at least 0.15.

11. The lubrication system of claim 9, wherein the at least one diffuser element has a main flow axis aligned with a direction of the relative motion.

12. The lubrication system of claim 1, wherein the at least one diffuser element is a flat diffuser.

13. A bearing, comprising:
a pair of mating surfaces subject to relative reciprocating motion; and
a microfluidic channel system comprising at least one diffuser element embedded in at least one of the mating surfaces, wherein the at least one diffuser element comprises a throat having a throat width and an exit having an exit width that is greater than the throat width;
wherein the microfluidic channel system comprises a first flow channel extending to the throat of the at least one diffuser element and a second flow channel extending from the exit, and wherein the exit width is greater than a width of both the first flow channel and the second flow channel;
wherein the first flow channel, second flow channel, and the at least one diffuser element are each defined by a pair of sides and a floor surface each extending from the first flow channel, entirely through the at least one diffuser element, and to the second flow channel, and wherein the pair of sides curve concavely between the throat and the exit of the at least one diffuser element.

14. A method of forming fluid-film lubrication between a pair of mating surfaces, comprising:
providing a microfluidic channel system comprising at least one diffuser element at an interface between the pair of mating surfaces, wherein the at least one diffuser element comprises a throat having a throat width and an exit having an exit width that is greater than the throat width;
connecting the mating surfaces to a source of lubricant; and
subjecting the mating surfaces to relative reciprocating motion, wherein the microfluidic channel system creates a coherent fluid film at the interface in response to the relative motion;
wherein the microfluidic channel system comprises a first flow channel extending to the throat of the at least one diffuser element and a second flow channel extending from the exit, and wherein the exit width is greater than a width of both the first flow channel and the second flow channel;
wherein the first flow channel, second flow channel, and the at least one diffuser element are each defined by a pair of sides and a floor surface each extending from the first flow channel, entirely through the at least one diffuser element, and to the second flow channel, and wherein the pair of sides curve concavely between the throat and the exit of the at least one diffuser element.

15. A downhole tool, comprising:
a bearing component, comprising:
a bearing surface within the downhole tool; and
a microfluidic channel system comprising at least one diffuser element embedded in the bearing surface, wherein the at least one diffuser element comprises a throat having a throat width and an exit having an exit width that is greater than the throat width;
wherein the microfluidic channel system comprises a first flow channel extending to the throat of the at least one diffuser element and a second flow channel extending from the exit, and wherein the exit width is greater than a width of both the first flow channel and the second flow channel;
wherein the first flow channel, second flow channel, and the at least one diffuser element are each defined by a pair of sides and a floor surface each extending from the first flow channel, entirely through the at least one diffuser element, and to the second flow channel;
wherein the downhole tool is a universal joint comprising an adapter having at least one recess and at least one torque transfer key adapted to mate with the recess.

16. The downhole tool of claim 15, wherein the bearing surface is a planar surface.

17. The downhole tool of claim 15, wherein the bearing surface is a curved surface.

18. The downhole tool of claim 15, wherein a ratio of the exit width to the throat width of the at least one diffuser element is in a range from 1.2 to 2.5.

19. The downhole tool of claim 18, wherein the at least one diffuser element has a length between the exit width and throat width, and wherein the ratio of the throat width to the length is at least 0.15.

* * * * *